W. P. HUNTLEY & R. M. BERKELEY.
AUTOMATIC SAFETY AIR BRAKE APPLIANCE.
APPLICATION FILED OCT. 22, 1914.
1,143,198.
Patented June 15, 1915.
2 SHEETS—SHEET 1.
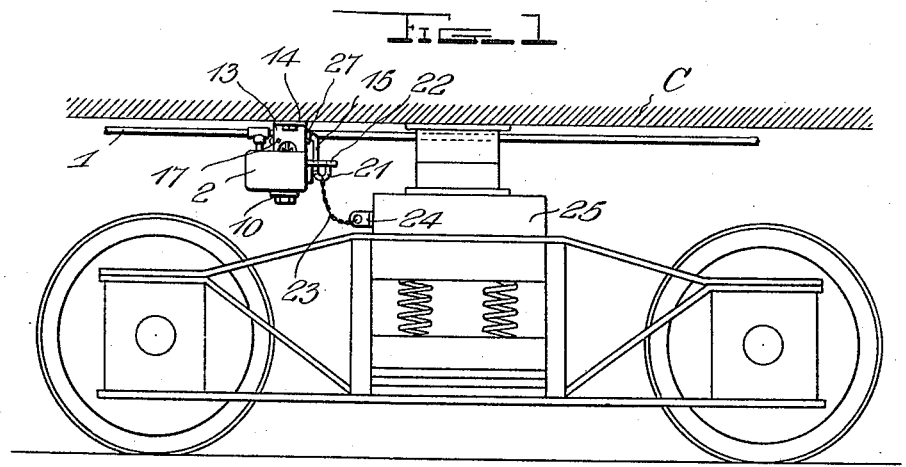
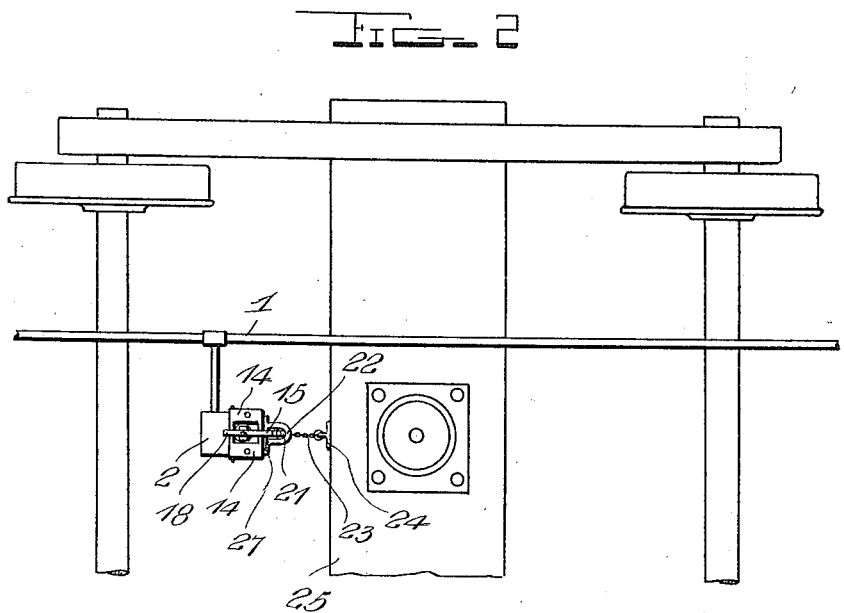
Witnesses
C. Clementer
Roland T. Booth
Inventors
Wesley P. Huntley
and Robert M. Berkeley
By H. B. Willson & Co.
Attorneys

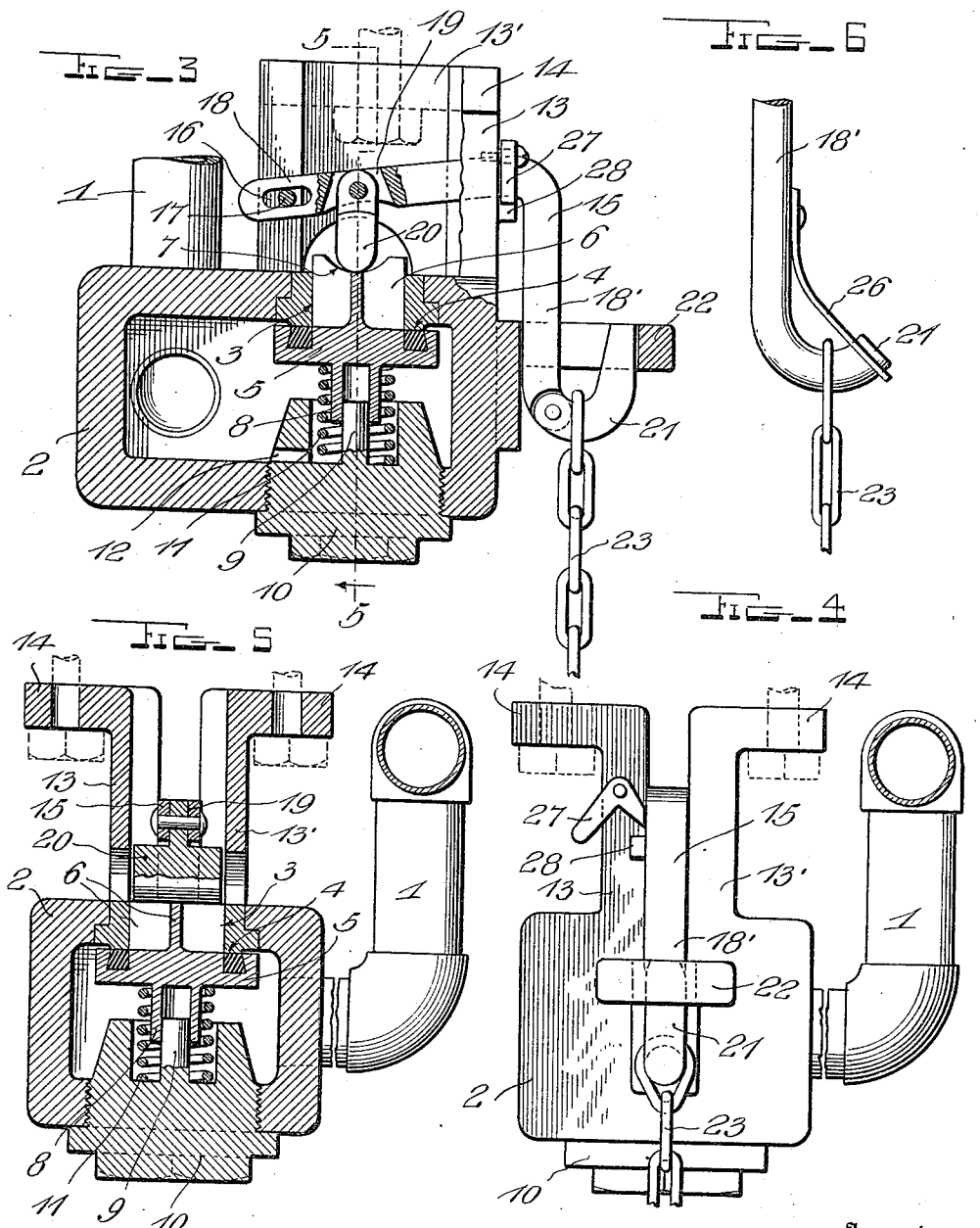

UNITED STATES PATENT OFFICE.

WESLEY PAMPLIN HUNTLEY, OF ASHLAND, KENTUCKY, AND ROBERT M. BERKELEY, OF RICHMOND, VIRGINIA.

AUTOMATIC SAFETY AIR-BRAKE APPLIANCE.

1,143,198.  Specification of Letters Patent.  Patented June 15, 1915.

Application filed October 22, 1914. Serial No. 868,060.

*To all whom it may concern:*

Be it known that we, WESLEY P. HUNTLEY, a citizen of the United States, residing at Ashland, in the county of Boyd, State of Kentucky, and ROBERT M. BERKELEY, a citizen of the United States, residing at Richmond, in the county of Henrico and State of Virginia, have invented certain new and useful Improvements in Automatic Safety Air-Brake Appliances; and we do declare the following to be a full, clear, and exact description of the invention, such as will enable others skilled in the art to which it appertains to make and use the same.

This invention relates to a safety air brake appliance for steam traction or other railways.

The object of the invention is to provide a device of this character which will automatically and instantly apply the ordinary air brakes with which most cars are equipped to the whole train the instant a single truck drops down for any cause such as is produced when a truck leaves the rails.

Another object is to provide a device of this character having an automatic valve so constructed and connected that the air of the train line is reliably released on the dropping of a truck.

With the above and other objects in view the invention consists of certain novel features of construction, combination and arrangement of parts as will be fully described and claimed.

In the accompanying drawings: Figure 1 represents a side elevation of a portion of a car equipped with this invention; Fig. 2 is a plan view thereof; Fig. 3 is a central vertical longitudinal section on an enlarged scale showing the parts in normal position; Fig. 4 is an end elevation of the device; Fig. 5 is a transverse section taken on the line 5—5 of Fig. 3; Fig. 6 is a fragmentary detail elevation showing a modified form of hook member.

The car to which this invention is shown applied, is divested of all parts which would tend to confuse and render obscure the application of the invention, such parts only are shown which are essential to properly illustrate the improvement. The air and traction brake system and connections may be of the ordinary well known type and need no description.

In the embodiment illustrated, a car body C is shown having a train line pipe 1 located and secured beneath it. A valve casing 2 is mounted on the bottom of the car body C and communicates with the air pipe 1, one of said casings being used on each car truck and preferably applied so as to set in line with the center line of the truck and car as shown, but it is obvious that it may be placed on the opposite sides thereof if desired. To attach this device to a car the train line 1 is tapped at a suitable place and connections made thereto and to the valve casing 2 to convey the train line air to the casing for a purpose to be described. This valve casing 2 may be constructed of any suitable material, preferably metal, and has an opening 3 provided with a valve seat 4 of fiber, rubber, or other suitable material. A valve 5 is mounted in said casing to normally close the opening 3 and is shown provided with upwardly extending wings 6 for guiding the valve to its seat, said wings projecting through the opening 3 and being recessed at the center as shown at 7 for the reception of an opening device, to be described. A hollow stem 8 depends from the valve 5 and is slidably engaged with a pin or stud 9 which projects upwardly from the center of a cap 10, here shown mounted in the opposed wall of the casing 2. A coiled spring 11 surrounds this hollow stem 8, bearing at one end against the valve 5 and at its other end against the bottom wall of the interior of the cap 10 and exerts its tension to hold said valve normally closed. A bore 12 extends transversely through one of the walls of the cap 10 and is designed to drain said cap of any moisture or sediment which may collect therein. This valve casing 2 is secured to the bottom of the car by any suitable means, uprights 13 and 13' being here shown provided at their upper ends with laterally extending arms 14 projecting in opposite directions and which are apertured to receive fastening bolts for securing the casing to the car body. A substantially L-shaped or right angular lever is fulcrumed at one end of one arm between these uprights, the arm which is fulcrumed being slotted longitudinally at its end as shown at 16 to receive a stud 17. This slot 16 permits the free movement of the lever 15 on its fulcrum.

The arm 18 of the lever 15 which is fulcrumed between the uprights is provided intermediately of its ends with a transversely extending recess 19 arranged in a plane at right angles to the slot 16 and in which projects a link 20, said link being pivotally mounted in said recess and having its free end engaged with the recessed portion of the valve wings 6, as is shown clearly in Figs. 3 and 5. The free end of this link 20 which engages the rounded recess in the upper end of the wings 6 is also rounded to permit the free downward movement of the force of the lever 15 on the valve 5 as will be hereinafter more fully described. The other arm 18' of the lever 15 extends downwardly and is provided at its terminal with a hook 21 pivotally connected at its inner end with said terminal as is shown clearly in Fig. 3. The lower end of this arm 18' and the hook 21 attached thereto extends through an apertured lateral extension or bracket 22 mounted on one wall of the casing 2 and when the valve is in closed position, the free end of this hook will be engaged with the wall of the opening in the bracket 22 and thus held in closed position for a purpose to be described. A flexible element 23 connects this hook 21 with a bracket 24 secured to the truck bolster or transom 25, said bracket being here shown T-shaped in construction with the stem thereof projecting laterally and apertured to receive the valve connecting element 23 which is here shown in the form of a chain but it is obvious that it may be a cable or other suitable flexible device.

In Fig. 6, is shown a slightly different form of connecting means for the element 23, the arm 18' of the lever 15 being here shown provided with a rigid integral hook 21' closed by a spring metal strip 26 secured at one end to the arm 18' with its free terminal extending over the terminal of the hook 21' and thereby retaining the chain 23 in engagement with said hook 21 under normal conditions. A gravity pawl 27 is mounted on the upright 13 and is adapted to swing over the top of the lever 15 for locking the valve 5 in open position after it has been opened in a manner to be described.

In the use of this invention, parts being in the position shown in Fig. 3, with the valve 5 closed and the flexible element 23 connecting the bracket 24 on the truck bolster with the hook 21 of the lever 15, should the truck break down or the wheels thereof become derailed, a strain will be exerted on the flexible element 23 on the dropping of said truck, thereby exerting a downward pull on the hook 21 which causes the link 20 to bear on the valve 5 and open said valve against the tension of the spring 11, thus permitting the train pipe air in the casing 2 to rush out into the atmosphere and automatically set the brakes on the car or train. When the free end of the hook 21 passes below the lower edge of the opening in the bracket 22, said hook will drop downwardly, thereby releasing the chain 23 to prevent strain being exerted on the valve and thus avoiding breakage of any of the parts or connections. When the lever 15 has moved down a predetermined distance, the upper arm of the gravity pawl 27 will swing over the top of said lever and lock it in lowered position, thus holding the valve open until all of the air in the train pipe is exhausted and thereby stopping the train or car with which the device is connected. A stop 28 is shown cast integral with standard 13 in position to engage the weighted arm of the pawl 27 when swung to locking position and thereby limit the swinging movement of the pawl. After the truck has been repaired and the car placed in operative position, the valve will be again closed by hand by disengaging the gravity pawl 27 from the lever 15, permitting the spring 11 to force the valve into closed position. The hook 21 will then be engaged with the element 23 and inserted in the bracket 22 and the device will be ready for further service.

From the above, it will be obvious that the device herein described, will automatically set the brakes on the engine or car to which it is applied in case of a broken truck or derailment of the wheels on the truck and thus avert accident and damage.

We claim as our invention:

1. The combination with a train line pipe, of a safety air brake appliance comprising a valve casing communicating with said pipe, a discharge opening in said casing, a spring-pressed valve normally closing said opening, a lever fulcrumed at one end adjacent said opening in the casing, an element carried by said lever and normally engaging said valve, a hook at the free end of said lever, means for closing said hook, a lever actuating element detachably engaged with said hook and operable to force said lever toward said valve to open the valve, a pawl for locking said lever in its valve opening position and a stop for limiting the locking movement of said pawl.

2. The combination with a train line pipe, of a safety air brake appliance comprising a valve casing communicating with said pipe and having a discharge opening therein, a valve seat surrounding said opening, a valve mounted in said casing for closing said opening and having a tubular stem extending into the casing, a stud mounted in said casing and inserted in said stem, a spring encircling said stem and exerting its tension to force said valve into normally closed position, an L-shaped lever fulcrumed adjacent said casing with a member engaging said valve, a flexible element detachably connected with the free end of said lever and adapted to be connected with a truck, means for locking said lever in valve opening position, and means for limiting the locking movement of said lever locking means.

In testimony whereof we have hereunto set our hands in presence of subscribing witnesses.

WESLEY PAMPLIN HUNTLEY.
ROBERT M. BERKELEY.

Witnesses:
M. K. WORM,
B. F. NOLTE,
GEORGE W. PRICE,
F. W. FERGUSON.

Copies of this patent may be obtained for five cents each, by addressing the "Commissioner of Patents, Washington, D. C."